United States Patent [19]

Hartog et al.

[11] Patent Number: 4,714,829

[45] Date of Patent: Dec. 22, 1987

[54] FIBRE OPTIC SENSING DEVICE AND METHOD

[75] Inventors: Arthur H. Hartog; David N. Payne, both of Southampton, England

[73] Assignee: National Research Development Corporation, London, England

[21] Appl. No.: 841,019

[22] Filed: Mar. 17, 1986

Related U.S. Application Data

[63] Continuation of Ser. No. 495,400, May 17, 1983, abandoned.

[30] Foreign Application Priority Data

May 18, 1982 [GB] United Kingdom ............... 8214384

[51] Int. Cl.⁴ .................................................. H01J 5/16
[52] U.S. Cl. ................................. 250/227; 250/231 R; 374/161

[58] Field of Search .......................... 250/227, 231 R; 350/96.24, 96.25, 96.32; 374/161, 162

[56] References Cited

U.S. PATENT DOCUMENTS

| | | | |
|---|---|---|---|
| 4,201,446 | 5/1980 | Geddes et al. | 374/161 |
| 4,316,388 | 2/1982 | Miller et al. | 374/161 |
| 4,342,919 | 8/1982 | Brogardh | 250/227 |
| 4,421,979 | 12/1983 | Asawa et al. | 250/227 |
| 4,450,434 | 5/1984 | Nielsen et al. | 250/227 |

Primary Examiner—David C. Nelms
Attorney, Agent, or Firm—Cushman, Darby & Cushman

[57] ABSTRACT

A detector comprises an optical radiation source (10) and a length of optic fibre (18) sensitive to local variations in a physical variable. Changes in radiation backscattered by the fibre are received by a detector (24) which gives an output dependent on local changes in the physical variable.

8 Claims, 6 Drawing Figures

FIBRE OPTIC SENSING DEVICE AND METHOD

This application is a continuation of Ser. No. 495,400 filed May 17, 1983, now abandoned.

BACKGROUND OF THE INVENTION

This invention relates to a sensing system in which the sensor is an optical fibre.

Usually the fibre will be a temperature sensor, but other variables such as pressure or stress may also be sensed.

Several forms of temperature sensors based on optical fibres are already known. In Applied Optics, Vol. 20, No. 19 1st Oct. 1981, pages 3408 to 3414, M. Gottlieb and G. B. Brandt describe a fibre optic temperature sensor in which thermally generated black-body radiation produced by a hot spot within the core of the fibre itself is sensed. In the same journal and volume, No. 22, 15th Nov. 1981, pages 3867 to 3873, the same authors describe an optical fibre temperature sensor in which transmission intensity effects are sensed; the device relies on loss effects in the cladding and jacket of the fibre.

A disadvantage of both prior art arrangements is that temperature can be sensed only at one position, at which the maximum temperature occurs, and that that position is unknown.

SUMMARY OF THE INVENTION

In the present invention the variable at any position along the fibre can be sensed, and related to the position, i.e. a distributed sensor is provided.

According to the invention, there is provided a detector apparatus including a fibre optic sensor comprising a length of optical fibre having a parameter which varies in accordance with a physical variable to be sensed, optical pulse supply means for supplying to said length of optical fibre a pulse of electromagnetic radiation at visible, ultraviolet or infrared wavelengths, radiation sensing means positioned to receive optical radiation back-scattered by the length of optical fibre and detector means responsive to said radiation sensing means to provide an output signal dependent on the intensity of the back-scattered radiation.

Usually, but not essentially, the variable to be sensed is temperature. The parameter of the fibre which varies locally in accordance with the variable may be an optical parameter such as the Rayleigh scattering coefficient or the refractive index of the fibre core or the refractive index of the fibre cladding or the absorption loss of the fibre.

In its simplest form the apparatus comprises a pulsed laser to supply pulses of radiation; a beam splitter through which pulses are transmitted to a coupling lens, and an index-matching cell through which pulses are coupled to the length of optical fibre; a further lens to focus light back-scattered by the fibre and reflected by the beam splitter; an optical receiver to receive the focused, back-scattered light; and an electronic processor to supply an output signal in convenient form.

In a preferred form said length of optical fibre is a length of liquid-core optical fibre, which is preferably coupled to the pulse supply means and the light sensing means through a length of solid core optical fibre.

Preferably, a mode filter is provided to render the apparatus substantially insensitive to changes in the numerical aperture of the fibre core.

Also according to the invention, there is provided a method of sensing the local value of a physical variable comprises providing a length of optical fibre having a parameter which responds to said physical variable, supplying to the fibre an optical pulse of radiation and sensing the variation of radiation back-scattered by said fibre. The method can be regarded as optical time domain reflectometry.

BRIEF DESCRIPTION OF THE DRAWINGS

The invention will now be described by way of example only with reference to the accompanying drawings in which.

DETAILED DESCRIPTION OF THE PREFERRED EMBODIMENT

Figure 1:
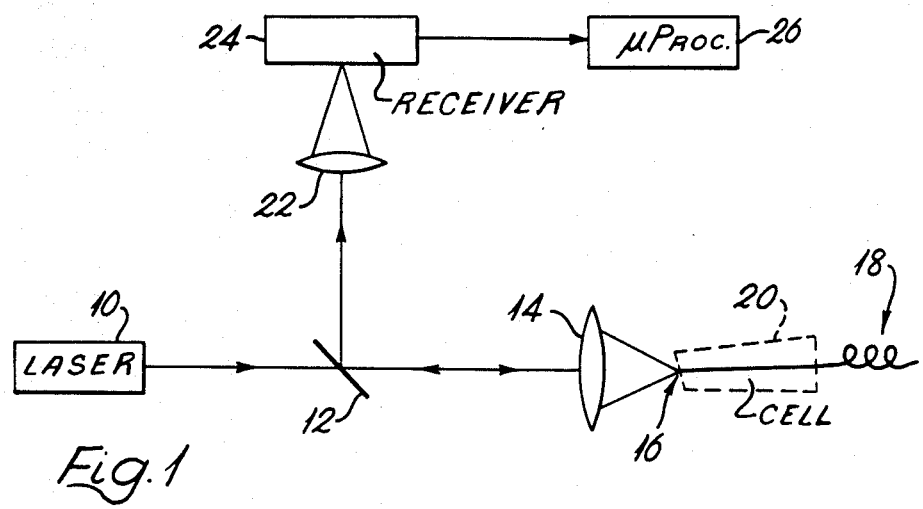
FIG. 1 illustrates schematically a basic distributed fibre optic temperature sensor according to the invention.

In FIG. 1, light from a pulsed laser 10 passes through a 50% beam splitter 12 and is focused by a lens 14 onto the end 16 of a length of test fibre 18. Optionally the end 16 is immersed in a cell 20 (shown dotted) of index matching liquid so that Fresnel reflection from the air-fibre interface is eliminated.

Any light back-reflected by the fibre 18 passes through the lens 14 and is reflected by the beam splitter 12 to be focused by a further lens 22 onto an optical receiver 24 connected to a microprocessor 26.

When an optical pulse from the laser 10 passes along the fibre, it is attenuated by several mechanisms, one of which is Rayleigh scattering. A portion of the optical power is continuously scattered in all directions and some of the scattered light is guided back towards the source and reaches the optical receiver 24. If the scattering and certain other fibre parameters are constant along the length of the fibre, the receiver 24 receives a signal which decays exponentially with time. Such an arrangement has previously been used to test the quality of optical fibres.

Figure 2:
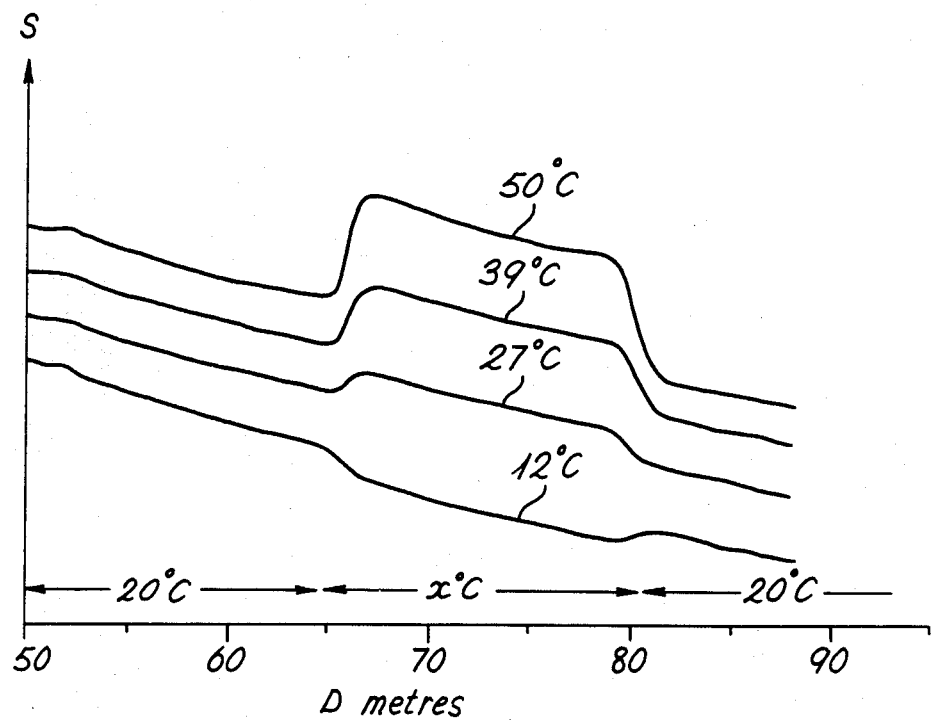
FIG. 2 illustrates typical back-scattered signals related to a local variable.

Suppose however that the test fibre 18 is of a construction such that the back-scattering is dependent on temperature, and that a length of the fibre is at a different temperature from the preceding and succeeding fibre lengths. The variation with time of the back-scattered radiation would then show a difference in intensity during the time interval in which light scattered in that length of fibre is received. Typical received signals are illustrated in FIG. 2 in which the back-scattered signals are plotted against time T corresponding to distance D of the scattering length from the end 16 of the fibre. A central section of the fibre 18 about 15 meters long is heated to three temperatures above and cooled to one temperature below an ambient temperature of 20° C., and typical corresponding back-scatter signals are illustrated. The magnitude of the step-change in intensity clearly indicates the temperature difference, and the times the step-changes are received indicate the positions of the temperature changes.

Let the power returning from a point at distance z from the end 16 of the fibre be P(z). It has been shown for the fibre-quality measurements using back-scatter sensing referred to above that:

$$P(z) = \tfrac{1}{2}P_o W S \alpha_s v_g \exp - \int_o^z (\alpha_f(x) + \alpha_b(x))dx \qquad (1)$$

where
$P_o$ = power launched
$W$ = pulse width
$\alpha_s$ = attenuation coefficient due to Rayleigh scattering
$\alpha_f(x)$ and $\alpha_b(x)$ = attenuation coefficients in forward and reverse directions, as functions of position x in the fibre $$v_g = \frac{C}{N_1} = \frac{C}{(n_1 - \lambda)\frac{dn_1}{d\lambda}}$$

is the group velocity in the fibre (C is the speed of light in vacuo, $n_1$ the refractive index of the core, and $\lambda$ the operating wavelength).
Here S is the back-scatter factor which, for step-index multimode fibres, may be expressed as:

$$S = \frac{3}{8} \frac{(NA)^2}{n_1^2} = \frac{3}{8} \frac{(n_1^2 - n_2^2)}{n_1^2} \qquad (2)$$

where $n_1$ and $n_2$ are the refractive indices of the core and cladding, respectively, and $NA = (n_1^2 - n_2^2)^{\frac{1}{2}}$ is the numerical aperture of the fibre.

Figure 3:
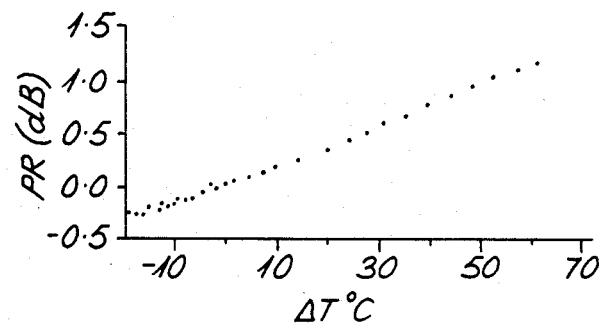
FIG. 3 illustrates the variation of power ratio with temperature difference.

From equation (1) it can be seen tht if the quantities S, $\alpha_s$, $n_1$ and $(\alpha_f + \alpha_b)$ are invariant with fibre length, the back-scattered signal decays exponentially, as explained above. It has now been realised that if one or more of the parameters varies strongly with temperature or another variable in a known way, then the back-scatter curve, as illustrated in FIG. 2, can be used to determine a change in the variable which locally affects the fibre, and also the position of the change along the fibre. A typical variation of power ratio PR in decibels against temperature difference ΔT in °C. is shown in FIG. 3.

The distance resolution of the sensor is limited by the pulse width of the laser, the frequency response of the receiver, and the dispersion (pulse distortion) of the fibre. Typically the pulse duration is between 1 and 300 nanoseconds.

Clearly, the more the parameter varies with, e.g. temperature, the higher the resolution of the sensor. While most optical fibres have some temperature variation in at least one of the parameters, fibre construction can be selected to maximise the variations. For example, liquids have relatively high temperature dependence of refractive index n, and Rayleigh scatter coefficient $\alpha_s$. From equation (1) it can be seen that the power back-scattered by the fibre is directly proportional to both the scattering coefficient $\alpha_s$, so that a preferred embodiment of the present invention uses a liquid core optical fibre.

Liquid core optical fibres have been known for sometime, see Electronics Letters July 27, 1972, Vol. 8 No. 15 pages 374 to 376, and Opto-electronics, 5, 1973, pages 297 to 307, in which papers Payne and Gambling describe the preparation and properties of liquid core optical fibres.

Figure 4:
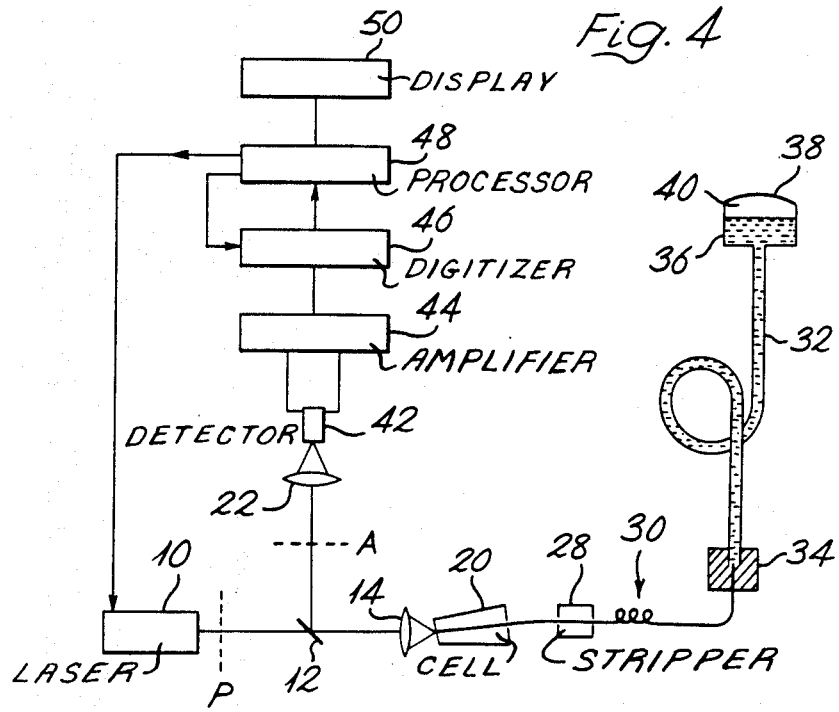
FIG. 4 illustrates schematically a preferred form of the sensor.

One embodiment of a distributed temperature sensor using a liquid core optical fibre is illustrated in FIG. 4. The pulsed laser 10, beam splitter 12, lenses 14 and 22, and index matching cell 20 are arranged as in FIG. 1. The lens 14 now focuses light onto a launch fibre 30 of conventional solid construction, the fibre 30 passing through a cladding-mode stripper 28 and into one end of a liquid core optical fibre 32. The ends of the fibres 30 and 32 are enclosed by a sealed joint 34 filled with the same liquid as the liquid core fibre 32. The other end of the fibre 32 is connected to a liquid-containing expansion chamber 36 sealed by a flexible diaphragm 38 to retain an inert gas in the space 40 over the liquid free surface.

Back-scattered light is reflected by the beam splitter 12 through the lens 22 onto a silicon avalanche photodetector 42 connected to a transimpedance amplifier 44. The output of amplifier 44 passes through a transient digitiser 46 to a digital processor 48 which supplies a display unit 50. The processor 48 is also connected to the laser 10.

Conveniently, the laser 10 is a semiconductor laser operating in the 0.85 to 0.91 micrometer region. The pulse width is chosen depending on the distance resolution required; a pulse width of 10 nanoseconds will give a resolution of about 1 meter.

The lens 14 focuses the pulsed laser beam onto the end face of the launch fibre. To minimise Fresnel reflection so as to avoid saturating the photodetector 42, the index matching cell 20 is arranged to have an angled receiving face adjacent the lens 14. Alternatively, a polariser P and analyser A are placed, as indicated by the broken lines, between the laser 10 and the beam splitter 12 and between the beam splitter 12 and the lens 22 respectively.

The launch fibre 30 carries the input pulses with low loss to the measurement zone, and is conveniently coupled to the liquid core optical fibre 32 by inserting a few centimeters of launch fibre into the liquid core and surrounding the joint with the core liquid in the sealed joint 34; clearly the launch fibre external diameter is preferably just less than the internal diameter of the core. To reduce coupling losses in the back-scattered light the core/cladding diameter ratio should be as large as is allowed by consideration of propagation loss in the launch fibre; for example a core-to-cladding diameter ratio of 1:1.4 will produce coupling losses of only 3 dB (optical) and insignificant propagation loss.

The launch fibre has the second function of limiting the range of angles at which back-scattered light is accepted from the liquid core fibre. The numerical aperture of the launch fibre 30 is arranged to be less than the numerical aperture at any point, including the hottest point, of the liquid core fibre 32. The reason is that, as the temperature of the liquid core fibre increases, as explained above, the major effects are that the scattering loss coefficient $\alpha_s$ increases and the refractive index $n_1$ decreases, causing the numerical aperture to decrease. In equation (1), these effects act in opposition on the power reaching the photodetector, so the effect of a change in numerical aperture must be eliminated. By arranging the launch fibre to place a limit on the numerical aperture of the device, i.e. to act as a mode filter, the arrangement is made largely insensitive to any change in numerical aperture of the liquid core fibre.

Alternatively, an angular stop (not illustrated) may be placed close to the lens 14 so as to limit the angular range of light rays which are allowed to pass to the photodetector 42.

A further temperature-dependent effect can be observed. The temperature changes along the fibre causes a longitudinal change in refractive index of the core, which causes ray bending at the interface between fibre lengths at different temperatures. The direction of bending is such that scattered rays are accepted by the mode filter which originally travelled at angles which would be rejected by the filter, leading to an error, but the effect is small compared with the temperature variation of the Rayleigh scattering coefficient $\alpha_s$ and adds to the latter effect.

The highest temperature to which the liquid core fibre can be exposed, other than the limitation of the liquid boiling point, is that at which temperature coefficient of refractive index of the liquid causes the numerical aperture of the liquid core fibre to decrease to that of the launch fibre. The lowest usuable temperature is close to the liquid freezing point.

The silicon avalanche photodetector 42 has an operating wavelength shorter than 1.1 micrometers and therefore the operating wavelength should be in this range. The transimpedance amplifier 44 has a low input impedance and has sufficient bandwidth to amplify pulses of similar width to the laser pulses without significant distortion, and should have a noise figure or input-equivalent noise power as low as possible to avoid signal degradation.

The transient digitiser 46 is controlled by the digital processor 48, and samples the back-scattered signal from each laser pulse at times corresponding to any point of interest along the fibre. All samples are preferably obtained from a single laser pulse, so fluctuations of laser output power do not affect the measurement. Any convenient method of measurement may be used, such as boxcar integration and averaging, single point analogue-to-digital conversion etc.

The processor 48 controls the operation of the laser 10 and the digitiser 46, averages sets of readings provided by the digitiser 46 to improve the signal-to-noise ratio, and processes the averaged back-scatter waveform, according to an algorithm depending on the nature of the temperature-sensitive parameter, and provides a suitable signal to the display unit 50.

The length of the liquid core sensing fibre is limited by the attenuation of the fibre and the pulse dispersion, but the use of a low dispersion launch fibre, e.g. a graded index fibre, allows the detection equipment to be at a position remote from the liquid core temperature sensing fibre, e.g. at a distance of several kilometers.

FIG. 4 illustrates a single distributed fibre optic temperature sensor. In practice, it is expected that multiple fibre sensors will be used, and such sensors may be multiplexed.

Figure 5:
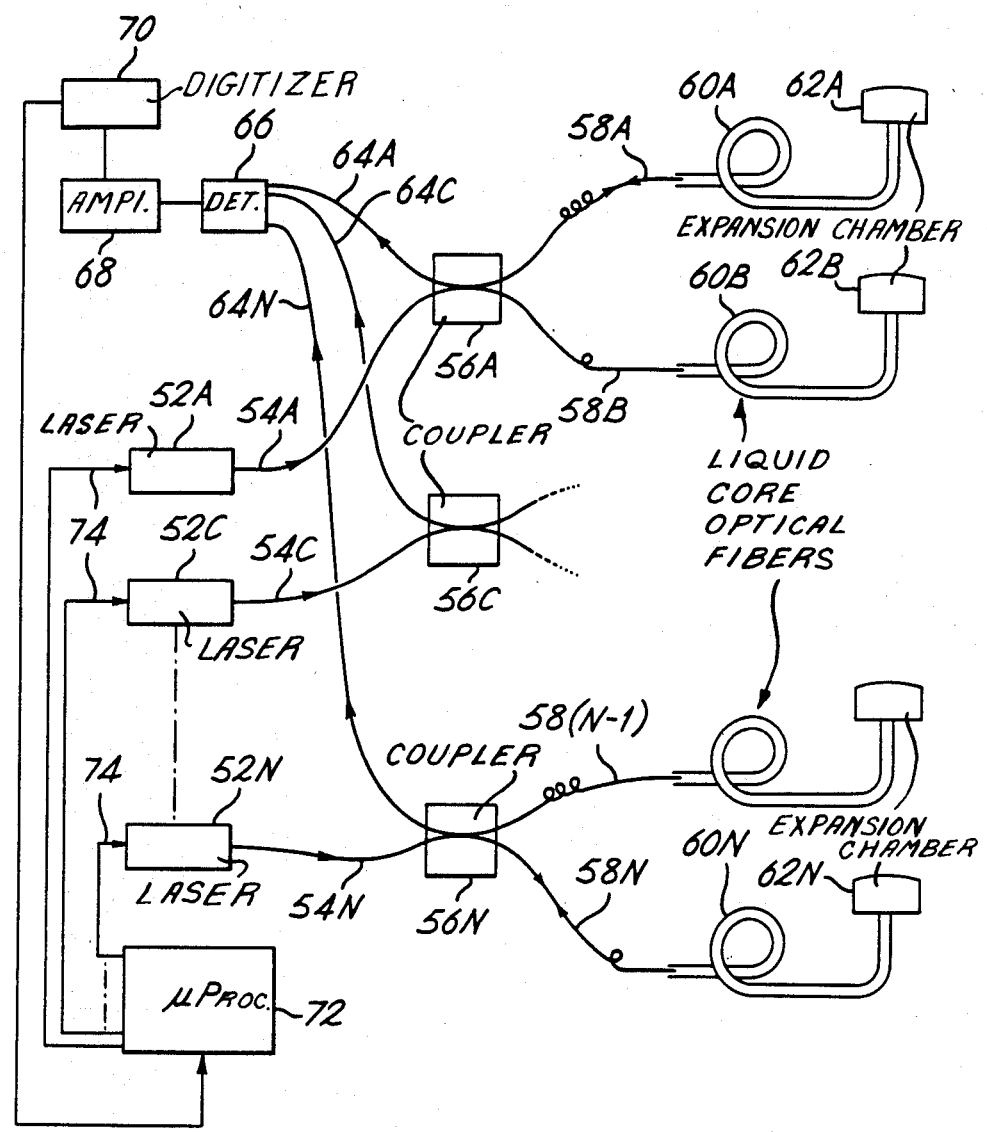
FIGS. 5 and 6 illustrate two alternative arrangements of a multiple distributed fibre optic temperature sensor.

A first embodiment of a time-division multiplexed sensor is shown schematically in FIG. 5. An array of lasers 52A, 52C ... 52N are each connected by a respective solid core input optical fibre 54A, 54C ... 54N to one part of an array of four-port couplers 56A, 56C ... 56N. Two further ports of each coupler 56 are connected through respective solid core optical fibres 58A, 58B ... 58N to the input ends of an array of liquid core optical fibres 60A, 60B ... 60N, each having an expansion chamber 62A, 62B ... 62N.

The solid core fibres 58 act as launch fibres, as in the FIG. 4 arrangement, and the two fibres connected to each coupler 56 are of different length, so that one fibre delays a signal from the coupler more than the other.

The fourth port of each coupler 56 is connected by a solid core output optical fibre 64A, 64C ... 64N to a detector 66. The detector 66 is connected through an amplifier 68 and a transient digitiser 70 to a microprocessor 72, which is connected to the laser 52 by trigger lines 74.

Each liquid core optical fibre 60 operates as in the FIG. 4 arrangement. The microprocessor 72 operates the lasers 52 to provide their input pulses to each coupler 56 at a different time. Each pulse is amplitude divided in the coupler and the launch fibres 58 delay one divided pulse with respect to the other, so that each liquid core optical fibre 60A receives a laser pulse at a different time, and the detector 66 receives back-scattered light from each fibre 60 in them without overlap.

Figure 6:
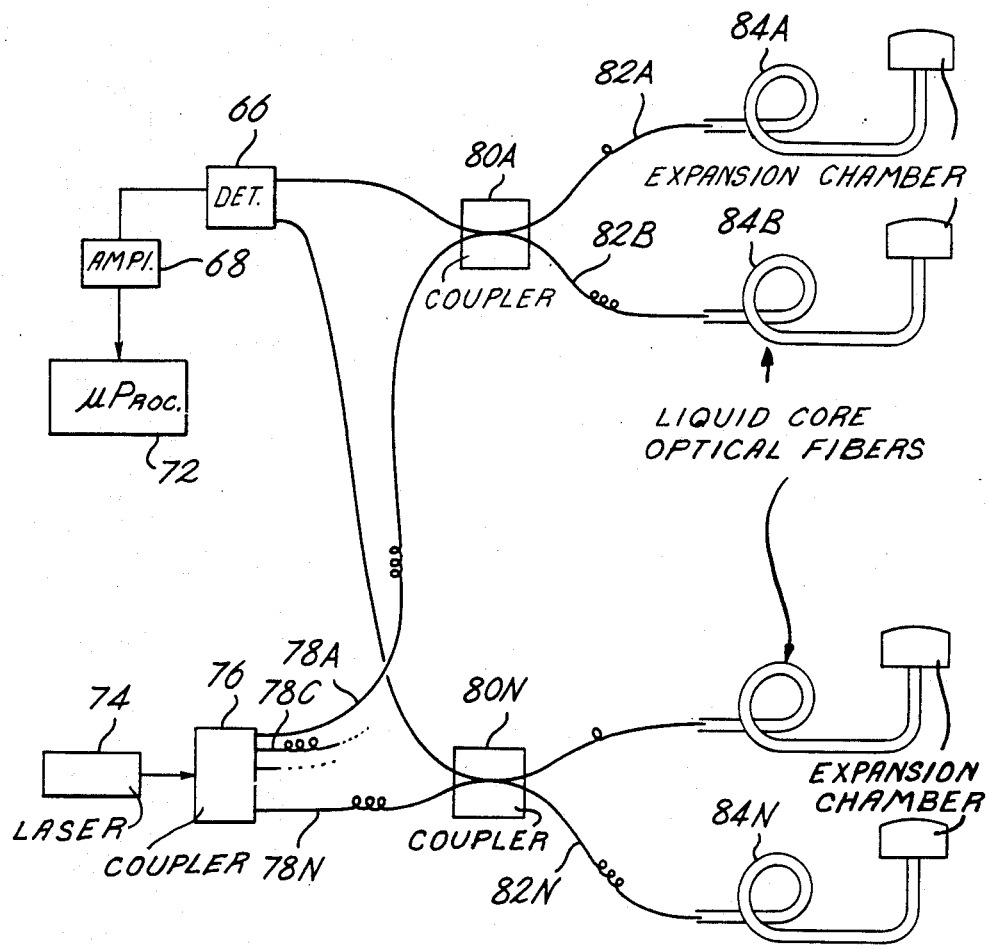

In an alternative embodiment of a time-division multiplexed sensor as shown in FIG. 6, a single pulsed laser 74 is connected to a star coupler 76 which supplies an array of solid core optical fibres 78A, 78C ... 78N, all of different lengths to act as delay lines. Each fibre 78 is connected to one input of a four-port coupler 80A ... 80N. Two outputs of each coupler 80 are connected to two further solid core optical fibres 82A, 82B ... 82N, which act as launch fibres for an array of liquid core optical fibres 84A, 84B ... 84N. The launch fibres are of different lengths to apply different delays to the pulse received by each coupler 80 as in FIG. 5. The fibres 78 apply different delays to the laser pulse to provide a pulse to each coupler 80 at a different time.

The liquid core optical fibres illustrated in FIGS. 4, 5 and 6 may be of any suitable type. One possible construction is described in the specification of UK Patent No. 1,390,426.

Typically, a liquid core optical fibre comprises of a hollow tube of silica or other glass drawn down to an external diameter of 300 micrometers and an internal diameter of 200 micrometers. If required, the interior or exterior of the tube may be modified before drawing by the deposition of a layer of material of a different refractive index to modify the optical or the mechanical properties of the fibre. For example a layer or layers of high-silica glass may be deposited inside the tube by, for example, chemical vapour deposition, so as to alter the refractive index of the glass in the vicinity of the core, thus modifying the waveguide properties, such as the numerical aperture, the number of modes guided, and the degree to which the power is confined to the core. The attenuation of the cladding region may be similarly modified, and the attenuation of high-order modes or unbound modes of the core enhanced or reduced.

The outside of the tube may be coated with highly-attenuating layers to prevent the propagation of modes not bound to the core region.

During pulling, the tube may be coated, typically with polyimide or silicone, to improve the mechanical strength. Polyimide is optically opaque and therefore has the additional advantage of preventing spurious propagation in the silica cladding region.

After drawing, the tube is then filled with a suitable ultra-high-purity liquid. For example tetrachloroethylene or hexachlorobuta 1-3 diene may be used.

In any of the arrangements described with reference to FIGS. 4, 5, and 6, it is of course possible to replace the liquid core fibres by solid core fibres, when the solid core launch fibres will not be required.

In some cases it may be possible to use monomode fibres; in such fibres the scatter coefficient $\alpha\alpha_s$ varies with temperature, as in multimode fibres, but in addition the back-scattered power is sensitive to variations in the numerical aperture, because numerical aperture variations also cause changes in the back-scatter capture fraction S which can be detected.

Monomode fibres have an additional property which can be utilised in a distributed fibre optic sensor. In such fibres, a substantial proportion of the power is carried by the fibre cladding; the proportion depends strongly on the difference in the refractive indices of the core and the cladding, and if the index difference is temperature-sensitive, then the ratio of the powers carried by the core and the cladding also changes.

The index difference can be made sensitive to temperature by constructing the fibre so that the temperature coefficients of refractive index of the materials used for core and cladding differ markedly. Alternatively, by using core and cladding materials having very different thermal expansion coefficients, the core can be made highly stressed, being either in compression or tension, depending on whether the thermal expansion coefficient of the core is less or greater than that of the cladding. The induced stress in the core results in an increase or decrease in refractive index, which depends on the magnitude and sign of the stress optic coefficient. When the fibre is locally heated, the increase in temperature results in a reduction in thermal stress in the core and a consequent change in refractive index. The change in refractive index can be used to sense temperature variations.

If the cladding is made to have a high optical loss, such as by doping it with optically-absorbing ions, then the overall loss characteristic of the fibre will be temperature sensitive. In a further variation, if the scattering coefficients of the monomode fibre and its cladding are different, then the scatter return of the fibre will be temperature sensitive.

Another form of solid core optical fibre which may be used in the invention is a fibre in which the core and cladding materials have widely different temperature coefficients of refractive index, such as a glass and a plastic, as with a liquid core fibre, the numerical aperture of the fibre will then be highly temperature sensitive. In general, any combination of core/cladding materials can be used, including two different glasses, or two different plastics, provided that at least one optical property of the combination varies locally in accordance with the temperature.

As an alternative to sensing a change in an optical property of the fibre caused directly by temperature effects, a temperature sensing system according to the invention may include a bimetallic strip in mechanical contact with the fibre so as to induce a microbending loss which can be sensed by a back-scattering method. In further variations, a coating can be applied to an optical fibre which causes microbending loss of known form when the fibre is mechanically stressed; thus local pressure and stress changes could be sensed as well as temperature variations. A vibration sensor is also a possibility.

It is an advantage of the use of an optical fibre sensor according to the invention in which the measurement is made optically that there are no hazards associated with electrical sparks if the equipment fails and that the sensor is immune to electromagnetic interference. The sensing equipment can be remote from the region of interest, and both temperature and position of any point along the fibre can be sensed.

We claim:

1. Detector apparatus including a fibre optic sensor comprising:

a length of optical fibre having a core and a sheath respectively comprising materials the refractive indices of which vary differentially in accordance with a physical variable to be sensed and which causes corresponding changes in the back-scattering of radiation injected into the optical fibre, optical pulse supply means for supplying to said length of optical fibre a pulse of electromagnetic radiation at wavelengths in a range including visible, ultraviolet and infrared wavelengths, mode filter means for rendering said detector apparatus substantially insensitive to changes in a numerical aperture of said fibre core;

radiation sensing means positioned to receive optical radiation back-scattered by the length of optical fibre, detector means responsive to said radiation sensing means to provide an output signal dependent on the intensity of the back-scattered radiation, processor means coupled to said detector means for deriving from said output signal a control signal dependent on sensor variations in said physical variable comparator means to compare changes in said control signal with a predetermined algorithm, and output means responsive to said control signal for providing an output signal dependent on said sensor variations.

2. Detector apparatus as claimed in claim 1 wherein said optical pulse supply means is a pulsed laser.

3. Detector apparatus as claimed in claim 2 wherein said laser is a semiconductor laser.

4. Detector apparatus as claimed in claim 3 wherein said semiconductor laser is adapted to emit radiation in the region of 0.85 to 0.91 micrometer wavelength.

5. Detector apparatus as claimed in claim 1 wherein said length of optical fibre has a liquid core sensitive to changes in a physical parameter to be sensed.

6. Detector apparatus as claimed in claim 5 wherein said liquid is trichlorethylene.

7. Detector apparatus as claimed in claim 6 wherein said liquid is hexachlorobuta 1-3 diene.

8. Detector apparatus as claimed in claim 5, wherein said mode filter means comprises a launch fibre positioned between said optical pulse supply means and said length of optical fibre.

* * * * *